United States Patent [19]

Kondo

[11] Patent Number: 4,708,385
[45] Date of Patent: Nov. 24, 1987

[54] REAR SEAT APPARATUS OF A TRUNK THROUGH TYPE

[75] Inventor: Nobuaki Kondo, Fujisawa, Japan

[73] Assignee: Nissan Motor Co., Ltd., Yokohama, Japan

[21] Appl. No.: 908,206

[22] Filed: Sep. 17, 1986

[30] Foreign Application Priority Data

Sep. 27, 1985 [JP] Japan .................. 60-213923

[51] Int. Cl.$^4$ .............................. B60N 1/02
[52] U.S. Cl. ...................... 296/65 R; 297/378; 297/379; 296/37.16
[58] Field of Search ............ 296/63, 65 R, 37.16; 297/378, 379

[56] References Cited

U.S. PATENT DOCUMENTS

| | | | |
|---|---|---|---|
| 4,191,417 | 3/1980 | Ferrara | 296/65 R |
| 4,286,819 | 9/1981 | Inoue et al. | 296/65 R |
| 4,572,569 | 2/1986 | Habmann | 296/65 R |

FOREIGN PATENT DOCUMENTS 59-15715  5/1984  Japan .

Primary Examiner—Robert R. Song
Attorney, Agent, or Firm—Schwartz, Jeffery, Schwaab, Mack, Blumenthal & Evans

[57] ABSTRACT

A rear seat apparatus of a trunk through type including a communicating port communicated with a trunk room comprises a top seat portion attached to a seat back support member forming the communicating port, right and left side seat portions disposed below both side ends of the top seat portion and having a fitting portion for fitting the upper portion of each side seat portion into a wheel housing device connected to the seat back support member, the lower portion of each side seat portion being attached to the lower portion of the wheel housing device, and a main seat back device disposed between the right and left side seat portions and pivotally attached to the seat back support member and covering the communicating port.

6 Claims, 4 Drawing Figures

REAR SEAT APPARATUS OF A TRUNK THROUGH TYPE

BACKGROUND OF THE INVENTION

The present invention relates to a rear seat apparatus of a trunk through type including a communicating port communicated with a luggage boot.

In a conventional rear seat apparatus such as the one disclosed in Japanese Utility Model Publication No. 59-15715, as shown in FIG. 1, the seat apparatus 1 for vehicle comprises a top portion 2 and right and left side portions 3 and 4 which are integrally formed in the shape of a U and form a communicating port 5 communicated with a trunk room.

Connecting rings 6 and 7 are respectively connected to the right and left side portions 3 and 4 at the bottom ends thereof and are connected to unillustrated respective right and left wheel housings. Both the side portions 3 and 4 are connected to each other by a reinforcing member 8 at their lower ends thereof. The reinforcing member 8 has attaching brackets 9 and 10 at both side ends thereof, and side hinge brackets 11 and 12 are fastened to the attaching brackets 9 and 10 by bolts 13a and 14, respectively. The side hinge brackets 11 and 12 are respectively connected to the back portions of main seat backs 15 and 16 by screws 17 and 18. Lock mechanisms 19 and 20 are respectively attached to the main seat backs 15 and 16 at the upper portions thereof to lock the main seat backs 15 and 16 into the frame of the seat apparatus when the main seat backs 15 and 16 are pivotally raised up. A central hinge bracket 21 is secured to the central portion of the reinforcing member 8 and has pins 22 and 23 projected on both sides thereof. The pins 22 and 23 of the central hinge bracket 21 are respectively inserted into and engaged with holes 24 and 25 disposed on opposite sides of the main seat backs 15 and 16. A plurality of attachment members 26 in the reinforcing member 8 are backwardly projected to secure the seat apparatus including the reinforcing member 8 to an unillustrated seat back support member.

FIG. 2 shows another embodiment of the conventional apparatus. A seat apparatus 1a comprises right and left side seat portions 3 and 4 and right and left main seat backs 15a and 16a disposed therebetween. The right and left side seat portions 3 and 4 respectively have unillustrated connecting rings disposed in the upper portions thereof and inserted into and engaged with unillustrated holes formed in a seat back support member 27. The right and left side seat portions 3 and 4 respectively have connecting rings 6 and 7 disposed in the bottoms thereof to attach the right and left side seat portions 3 and 4 to unillustrated wheel housings. Top portions 2a and 2b are integrally formed with the right and left main seat backs 15a and 16a, respectively. A side hinge bracket 11 has a hole for attaching the hinge bracket 11 to the seat back support member 27 by screwing a bolt 45 into this hole and an engaging hole 27a disposed in the seat back support member 27. The main seat backs 15a and 16a are rotatably supported at the outer lower ends thereof by the seat back support member 27 by screwing a bolt 13b into a hole disposed in each side hinge bracket 11 and each of engaging holes of the main seat backs 15a and 16a disposed at the outer lower ends thereof. A central hinge bracket 21 is secured to the seat back support member 27 by screwing bolts 28 into central engaging holes 60 of the seat back support member 27. The central hinge bracket 21 has pins 22 and 23 projected on both sides thereof and engaged with engaging holes 24 and 25 of the right and left main seat backs 15a and 16a disposed on the opposite sides thereof to rotatably support the seat backs 15a and 16a on the central sides thereof. A seat striker 29 is secured onto the seat back support member 27 and is fitted into a hole 30 disposed in the back portion of each of the main seat backs 15a and 16a. The seat striker 29 can be engaged and disengaged from each main seat back by an unillustrated locking mechanism.

In the conventional apparatus shown in FIG. 1, it is necessary to dispose the reinforcing member 8 which holds the strength of the integrally formed U-shaped seat back frame and which rotatably supports the main seat backs 15 and 16, thereby increasing the weight of the seat apparatus 1 and the number of operations for attaching the apparatus to a vehicle which is troublesome. In the conventional apparatus shown in FIG. 2, the seat apparatus 1a is divided into four sections, i.e., the right and left side portions 3 and 4, and the right and left main seat backs 15a and 16a which are independently attached to the seat back support member 27. Therefore, clearances tend to be formed between these individual members and the top portions of the side seat portions 3 and 4 may be not in alignment with the top portions 2a and 2b of the main seat backs 15a and 16a in the widthwise direction of the apparatus, thereby the appearance looking bad.

SUMMARY OF THE INVENTION

To overcome the problems mentioned above, an object of the present invention is to provide a rear seat apparatus of a trunk through type in which the weight of the apparatus is reduced and the apparatus is easily assembled and the appearance thereof looks good.

With the above object in view, the present invention resides in a rear seat apparatus of a trunk through type including a communicating port communicated with a trunk room, said apparatus comprising a top seat portion attached to a seat back support member forming said communicating port, right and left side seat portions disposed below both side ends of the top seat portion and having a fitting portion for fitting the upper portion of each side seat portion into wheel housing means connected to the seat back support member, the lower portion of each side seat portion being attached to the lower portion of the wheel housing means, and main seat back means disposed between the right and left side seat portions and pivotally attached to the seat back support member and covering the communicating port.

BRIEF DESCRIPTION OF THE DRAWINGS

The present invention will be more apparent from the preferred embodiments thereof in conjunction with the drawings which.

DETAILED DESCRIPTION OF THE PREFERRED EMBODIMENTS

Figure 1:
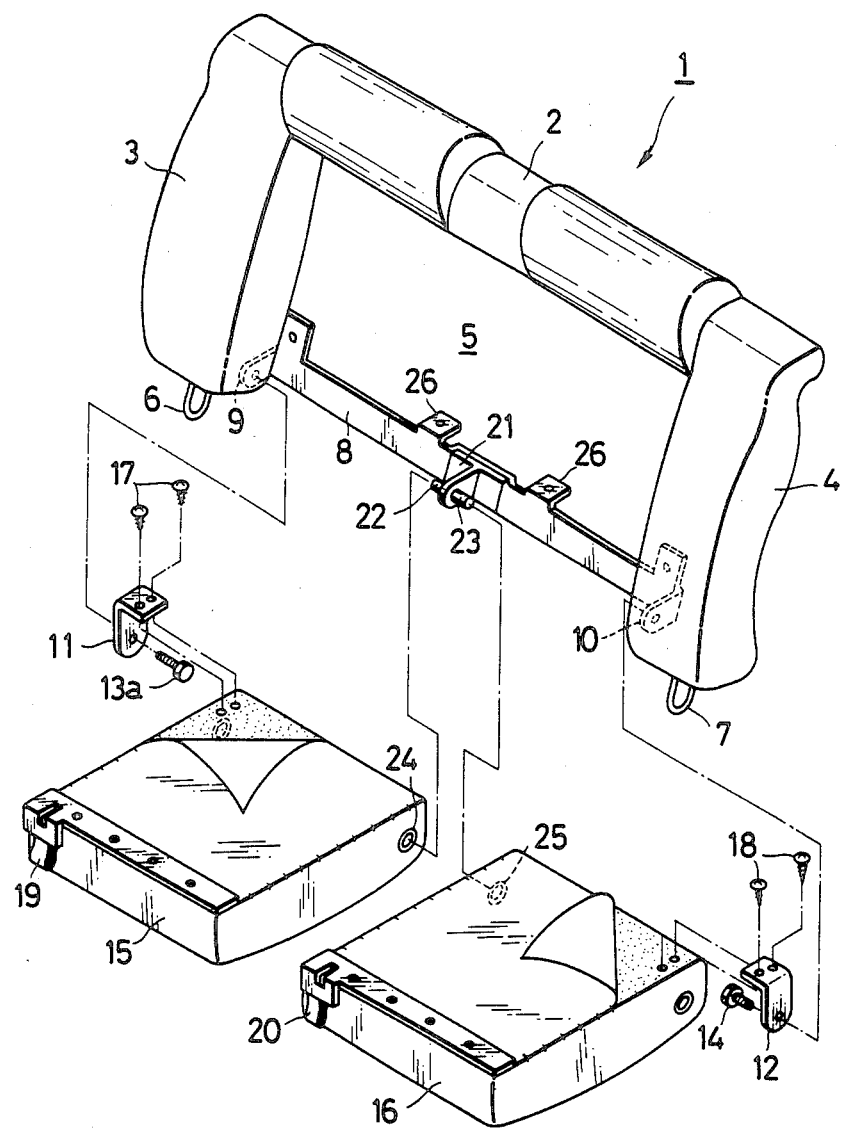
FIG. 1 is an exploded perspective view showing the construction of a conventional rear seat apparatus of a trunk through type.
Figure 2:
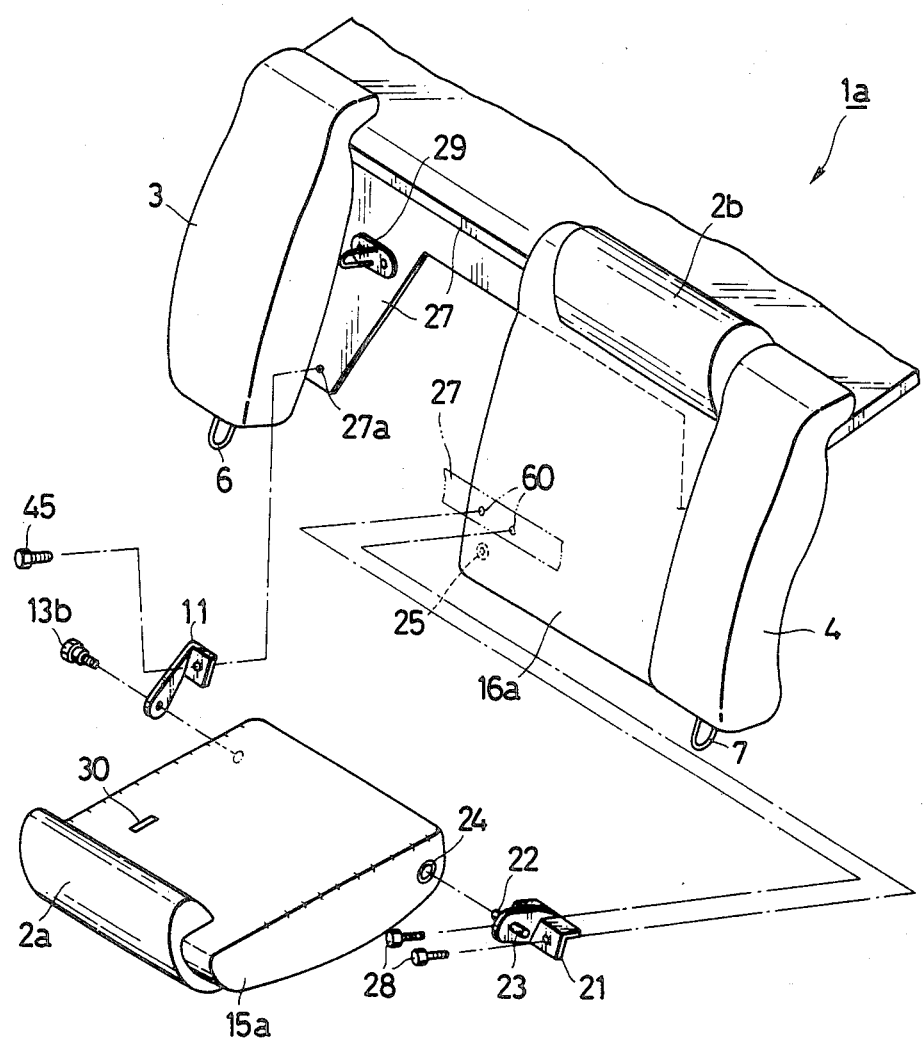
FIG. 2 is an exploded perspective view showing the construction of another conventional rear seat apparatus of a trunk through type.
Figure 3:
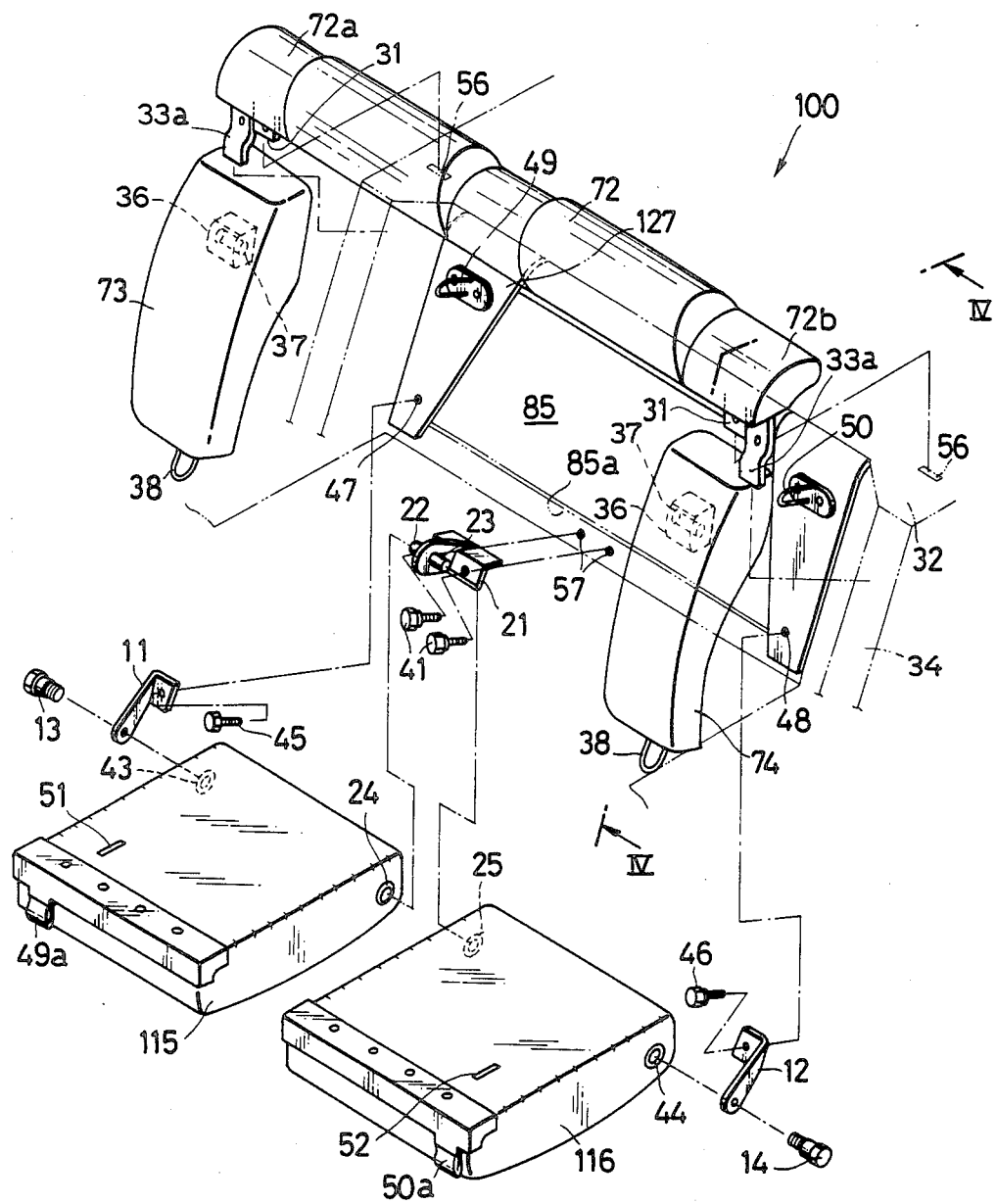
FIG. 3 is an exploded perspective view showing the construction of a rear seat apparatus of a trunk through type according to one embodiment of the present invention.
Figure 4:
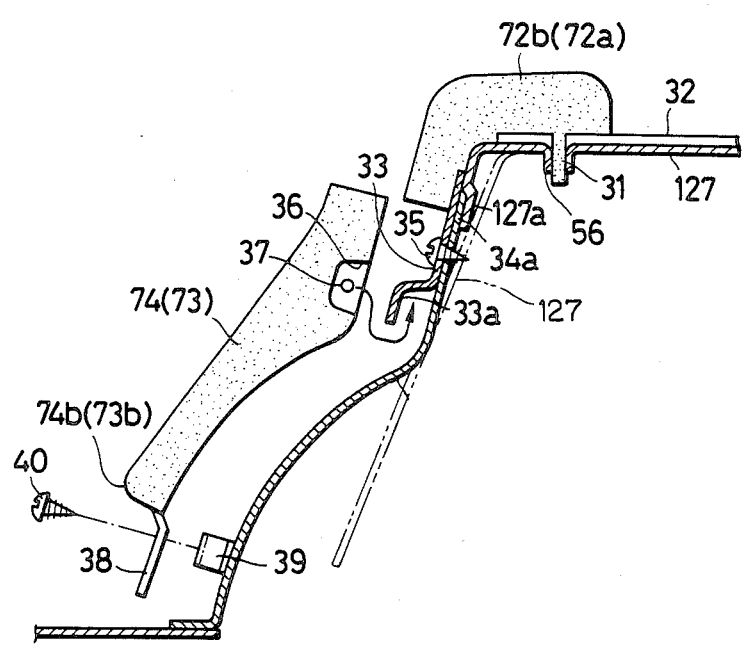
FIG. 4 is a sectional view raken along Line IV—IV of FIG. 3.

In FIG. 3, a rear seat apparatus 100 according to the present invention comprises a top portion 72, right and left side seat portions 73 and 74 disposed below the top portion 72, and a pair of main seat backs 115 and 116 disposed between the right and left side seat portions 73 and 74. The top portion 72 has a pair of side end portions 72a and 72b integral with the central portion of the top portion 72 therebetween. A connecting ring 31 is disposed in the bottom of each of the side end portions 72a and 72b and projects downwardly therefrom. As shown in FIG. 4, the connecting ring 31 extends through a seat back support member 127 and a parcel shelf 32 disposed on the seat back support member 127 and is fitted into a fitting hole 56 of the seat back support member 127, thereby attaching the top portion 72 to the seat back support member 127. The connecting ring 31 may be also disposed in the generally central portion of the top portion 72 in the widthwise direction thereof. Each of the lower side ends 127a of the seat back support member 127 contacts the upper end 34a of a right wheel housing 34 to which a bracket 33 having a hook portion 33a is secured by a screw 35 for example.

The right and left side seat portions 73 and 74 are symmetrically disposed on the right and left sides of the main seat backs 115 and 116. The construction of the right side seat portion 73 is similar to that of the left side seat portion 74. Therefore, the construction of only the right side seat portion 73 will be explained in the following descriptions. As shown in FIG. 4, a notch 36 is disposed on the upper rear surface of the right side seat portion 73 and a pin 37 secured to the right side seat portion 73 projects into the notch 36 at the generally central portion thereof. The pin 37 is inserted into the clearance between the hook portion 33a of the bracket 33 and the wheel housing 34 and is engaged with the hook portion 33a to attach the upper portion of the right side seat portion 73 to the wheel housing 34 below the right side end 72a of the top portion 72. A connecting ring 38 is disposed in the lower end 73b of the right side seat portion 73 and is attached by a screw 40 to a bracket 39 secured to the lower side portion of the wheel housing 34. The left side seat portion 74 is attached to the left wheel housing by the same attachment means as the one in the right side seat portion 73. The seat back support portion 127 is located between the right and left side seat portions 73 and 74 and forms a communicating port 85 communicating the vehicle compartment with a trunk room or a luggage boot. The central lower portion of the communicating port 85 is also defined by a lower connecting member 85a having holes 57 in the center thereof. The communicating port 85 is covered by the main seat backs 115 and 116. A central hinge bracket 21 is attached to the lower connecting member 85a by screwing bolts 41 into the holes 57 of the lower connecting member 85a through holes disposed in the central hinge bracket 21. Pins 22 and 23 of the central hinge bracket 21 project on both sides thereof and are respectively inserted into and engaged with engaging holes 24 and 25 disposed on the opposite sides of the main seat backs 115 and 116 so as to rotatably support them around the pins 22 and 23. The side hinge brackets 11 and 12 are respectively attached to the side portions of seat back support members 127 which extend generally downward out from under shelf 32, by screwing bolts 45 and 46 into engaging holes 47 and 48 disposed in the lower side portions of the seat back support members 127 through holes of the side hinge brackets 11 and 12 disposed at one ends thereof. The side hinge brackets 11 and 12 are respectively attached to the main seat backs 115 and 116 by screwing bolts 13 and 14 into holes 43 and 44 disposed in the lower outer sides of the main seat backs 115 and 116 through holes of the side hinge brackets 11 and 12 disposed at the other ends thereof. The main seat backs 115 and 116 are thus pivotally supported by the seat back support member 127. Seat strikers 49 and 50 are attached to the upper side portions of the seat back support members 127 and are respectively fitted into holes 51 and 52 disposed on the upper back surfaces of the main seat backs 115 and 116. The seat strikers 49 and 50 can be locked and unlocked from the respective main seat backs 115 and 116 through their holes 51 and 52 by a conventional locking mechanism not shown. Handles 49a and 50a respectively attached to the main seat backs 115 and 16 at the top portions thereof are used with the locking mechanism to unlock the seat strikers 49 and 50 from the respective main seat backs 115 and 116 when the handles 49a and 50a are respectively pulled out of the main seat backs 115 and 116.

When the rear seat apparatus of a trunk through type mentioned above is assembled in a vehicle, the connecting rings 31 downwardly projecting from the side portions 72a and 72b of the top portion 72 are first inserted into the fitting holes 56 disposed on the parcel shelves 32 of the seat back support member 127 to attach the top portion 72 to the seat back support member 127. The pin 37 projecting into the notch 36 disposed on the back surface of each of the right and left side seat portions 73 and 74 is then fitted inside the hook portion 33a of the bracket 33 and is engaged with the hook portion 33a. The connecting ring 38 disposed at the lower end of each of the right and left side seat portions 73 and 74 is then attached by a screw 40 to the bracket 39 secured to the lower portion of the wheel housing 34. The main seat backs 115 and 116 are rotatably attached by the central hinge bracket 21 to the lower connecting member 85a of the seat back support member 127 on the central side thereof and by the side hinge brackets 11 and 12 to both sides of the seat back support member 127. The top portion 72 may be attached to the seat back support memmber 127 after the right and left side seat portions 73 and 74 and the main seat backs 115 and 116 are attached to the seat back support member 127.

As mentioned above, in a rear seat apparatus of a trunk through type according to the present invention, the overall construction of the apparatus is simplified and the apparatus is easily assembled and the appearance thereof looks good. Namely, it is not necessary to dispose a strengthening member such as a reinforcing member for holding the rigidity of the right and left side seat portions so that the weight of the apparatus can be reduced. Further, since the operations in assembly are simplified, the operational efficiency is improved. Furthermore, the number of parts can be reduced since it is unnecessary to dispose the reinforcing member, attachment brackets, bolts etc. for attaching the reinforcing member to the seat back support member.

The top portion and the right and left side seat portions attached to the seat back support member are not moved with respect to each other so that a pair of main seat backs pivotally disposed between the right and left side seat portions are reliably moved. Furthermore, according to the present invention, there are no clearances between the top portion, the right and left side seat portions and the main seat portions. The top portions of the side seat portions are in alignment with the top portions of the main seat backs in the widthwise direction of the apparatus at all times. Accordingly, the appearance of the apparatus can be prevented from being made bad for a long period so that the present invention can be applied to various rear seat apparatuses of a trunk through type.

What is claimed is:

1. A rear seat apparatus of a trunk through type including a communicating port communicated with a trunk room, said apparatus comprising:
    a top seat portion attached to a seat back support member forming said communicating port;
    right and left side seat portions disposed below both side ends of the top seat portion and each having a fitting portion for fitting the upper portion of each side seat portion to wheel housing means connected to the seat back support member, the lower portion of each side seat portion being attached to the lower portion of the wheel housing means; and
    main seat back means disposed between the right and left sde seat portions and pivotally attached to the seat back support member and covering the communicating port.

2. A rear seat apparatus of a trunk through type as claimed in claim 1 wherein said main seat back means comprises a pair of main seat backs each pivotally attached to the seat back support member.

3. A rear seat apparatus of a trunk through type as claimed in claim 2 wherein said wheel housing means comprises wheel housings for the side seat portions connected to the seat back support member and a bracket attached to each wheel housing, and the fitting portion of each side seat portion has a notch disposed in the upper back portion thereof and a support pin disposed within the notch and engaged with each bracket of the wheel housing means, and each of the right and left side seat portions has a connecting ring disposed at the lower end thereof and a connecting bracket secured to each wheel housing is attached to the connecting ring of each side seat portion.

4. A rear seat apparatus of a trunk through type as claimed in claim 2 wherein said seat back support member has right and left support portions disposed adjacent the right and left side seat portions and a lower connecting portion connected to the right and left support portions at the lower portions thereof and defining the communicating port in cooperation with the right and left support portions, a hinge bracket being attached to each of said right and left support portions in the lower portion thereof for pivotally attaching each main seat back to the seat back support member, a seat striker being attached to each of said right and left support portions in the upper portion thereof, each of the main seat backs having a hole disposed in the back portion thereof and receiving each seat striker to lock and unlock each main seat back from each support portion.

5. A rear seat apparatus of a trunk through type as claimed in claim 4 wherein a central hinge bracket is attached to said lower connecting portion of the seat back support member and is dsposed between the main seat backs and pivotally attaches each main seat back to the seat back support member.

6. A rear seat apparatus of a trunk through type as claimed in claim 1 wherein said top seat portion has a connecting ring disposed in the bottom thereof and said seat back support member has a parcel shelf in the upper portion thereof and a fitting hole disposed in the parcel shelf and receiving the connecting ring of the top seat portion to attach the top seat portion to the seat back support member.

* * * * *